United States Patent
Kitahara

(10) Patent No.: US 9,967,764 B2
(45) Date of Patent: May 8, 2018

(54) MONITORING APPARATUS, WIRELESS COMMUNICATION SYSTEM, FAILURE-CAUSE DISTINGUISHING METHOD, AND NON-TRANSITORY COMPUTER READABLE MEDIUM STORING PROGRAM

(71) Applicant: NEC Corporation, Tokyo (JP)

(72) Inventor: Yoshinori Kitahara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days. days.

(21) Appl. No.: 15/115,962

(22) PCT Filed: Jan. 8, 2015

(86) PCT No.: PCT/JP2015/000047
§ 371 (c)(1),
(2) Date: Aug. 2, 2016

(87) PCT Pub. No.: WO2015/118794
PCT Pub. Date: Aug. 13, 2015

(65) Prior Publication Data
US 2017/0181018 A1    Jun. 22, 2017

(30) Foreign Application Priority Data
Feb. 5, 2014   (JP) ................................ 2014-019928

(51) Int. Cl.
*H04B 17/00*   (2015.01)
*H04W 24/08*   (2009.01)
(Continued)

(52) U.S. Cl.
CPC ........ *H04W 24/08* (2013.01); *H04B 17/3911* (2015.01); *H04W 24/10* (2013.01)

(58) Field of Classification Search
CPC ........................... H04W 24/08; H04B 17/3911
(Continued)

(56) References Cited

U.S. PATENT DOCUMENTS

| 2004/0127162 A1* | 7/2004 | Maki ..................... H04W 24/00 455/67.11 |
| 2007/0189260 A1 | 8/2007 | Chang |

(Continued)

FOREIGN PATENT DOCUMENTS

| EP | 2 056 497 A2 | 5/2009 |
| JP | H03-198438 A | 8/1991 |

(Continued)

OTHER PUBLICATIONS

International Search Report corresponding to PCT/JP2015/000047, dated Mar. 24, 2015 (5 pages).

(Continued)

*Primary Examiner* — Ayodeji Ayotunde
(74) *Attorney, Agent, or Firm* — Wilmer Cutler Pickering Hale and Dorr LLP

(57) ABSTRACT

A monitoring apparatus, a wireless communication system, a failure-cause distinguishing method, and a non-transitory computer readable medium storing a program that enable a user to appropriately cope with fading are provided. A monitoring apparatus (1) includes an acquisition unit (12) and a distinguishing unit (14). The acquisition unit (12) acquires history data which is generated in one or more wireless communication apparatuses and which indicates at least information related to the time at which failures have occurred in each predetermined time period and related to a received signal level therein. The distinguishing unit (14) distinguishes the type of fading that has occurred in the wireless lines related to the wireless communication apparatuses based on the history data.

18 Claims, 9 Drawing Sheets

(51) Int. Cl.
*H04B 17/391* (2015.01)
*H04W 24/10* (2009.01)

(58) Field of Classification Search
USPC .................................................. 455/67.11
See application file for complete search history.

(56) References Cited

U.S. PATENT DOCUMENTS

| | | |
|---|---|---|
| 2007/0195893 A1 | 8/2007 | Kim et al. |
| 2009/0149133 A1* | 6/2009 | Yoneyama ............ H04B 17/007 455/67.13 |
| 2009/0175226 A1 | 7/2009 | Ren et al. |
| 2010/0091643 A1* | 4/2010 | Tu ........................ H04W 48/16 370/216 |
| 2013/0288727 A1 | 10/2013 | Chirayil |

FOREIGN PATENT DOCUMENTS

| | | |
|---|---|---|
| JP | H03-232322 A | 10/1991 |
| JP | H09-284186 A | 10/1997 |
| JP | 2001-086047 A | 3/2001 |
| JP | 2002-314494 A | 10/2002 |
| JP | 2006-119757 A | 5/2006 |
| JP | 2009-117954 A | 5/2009 |
| JP | 2009-534873 A | 9/2009 |
| JP | 2011-055537 A | 3/2011 |
| JP | 2012-074765 A | 4/2012 |
| WO | WO-2013/110849 A1 | 8/2013 |

OTHER PUBLICATIONS

Partial Supplementary European Search Report issued by the European Patent Office for European Application No. 15746489.2 dated Aug. 25, 2017 (16 pages).

* cited by examiner

HISTORY DATA

| TIME | ERROR TIME Te (s) | FAILURE OCCURRENCE TIME Tf (s) | RSLmin (dBm) | RSLmax (dBm) |
|---|---|---|---|---|
| ⋮ | ⋮ | ⋮ | ⋮ | ⋮ |
| 2014/01/01_7:00 | | | | |
| 2014/01/01_7:15 | | | | |
| 2014/01/01_7:30 | | | | |
| 2014/01/01_7:45 | | | | |
| 2014/01/01_8:00 | | | | |
| 2014/01/01_8:15 | | | | |
| 2014/01/01_8:30 | | | | |
| ⋮ | ⋮ | ⋮ | ⋮ | ⋮ |

FAILURE CAUSE LIST

DISPLAY PERIOD  From 2014/01/01  to 2014/01/31

| APPARATUS NAME | APPARATUS TYPE | INTERFERENCE FADING | ATTENUATION FADING | DUCT TYPE FADING | OUTPUT BREAK OF TRANSMITTING SIDE | INSTRUMENT FAULT |
|---|---|---|---|---|---|---|
| APPARATUS A | APPARATUS TYPE A | 60 (min) | 0 (min) | 0 (min) | 0 (min) | 0 (min) |
| APPARATUS B | APPARATUS TYPE B | 0 (min) | 45 (min) | 0 (min) | 0 (min) | 0 (min) |
| APPARATUS C | APPARATUS TYPE C | 0 (min) | 0 (min) | 90 (min) | 0 (min) | 0 (min) |
| APPARATUS D | APPARATUS TYPE D | 0 (min) | 0 (min) | 0 (min) | 120 (min) | 0 (min) |
| APPARATUS E | APPARATUS TYPE E | 0 (min) | 0 (min) | 0 (min) | 90 (min) | 30 (min) |

Fig. 8

APPARATUS-SPECIFIC TIME SERIES LIST

APPARATUS NAME : APPARATUS TYPE A

DISPLAY PERIOD  From 2014/01/01 to 2014/01/31

| FAILURE CAUSE TYPE | START TIME | END TIME | PERIOD (min) |
|---|---|---|---|
| INTERFERENCE FADING | 2014/01/01_08:00 | 2014/01/01_08:15 | 15 |
| INTERFERENCE FADING | 2014/01/01_20:00 | 2014/01/01_20:30 | 30 |
| ATTENUATION FADING | 2014/01/04_12:00 | 2014/01/04_12:15 | 15 |
| DUCT TYPE FADING | 2014/01/07_08:00 | 2014/01/07_08:30 | 30 |
| OUTPUT BREAK OF TRANSMITTING SIDE | 2014/01/09_15:00 | 2014/01/09_18:00 | 180 |
| INSTRUMENT FAULT | 2014/01/10_18:00 | 2014/01/10_21:00 | 180 |

Fig. 9

MONITORING APPARATUS, WIRELESS COMMUNICATION SYSTEM, FAILURE-CAUSE DISTINGUISHING METHOD, AND NON-TRANSITORY COMPUTER READABLE MEDIUM STORING PROGRAM

CROSS-REFERENCE TO RELATED APPLICATIONS

This application is a national stage application of International Application No. PCT/JP2015/000047 entitled "Monitoring Apparatus, Wireless Communication System, Failure-Cause Distinguishing Method, and Non-Transitory Computer Readable Medium Storing Program" filed on Jan. 8, 2015, which claims priority to Japanese Patent Application No. 2014-019928, filed on Feb. 5, 2014, the disclosures of each which are hereby incorporated by reference in their entirety.

TECHNICAL FIELD

The present invention relates to a monitoring apparatus, a wireless communication system, a failure-cause distinguishing method, and a non-transitory computer readable medium storing a program. In particular, the present invention relates to a monitoring apparatus, a wireless communication system, a failure-cause distinguishing method, and a non-transitory computer readable medium storing a program for monitoring history data of a wireless communication apparatus.

BACKGROUND ART

In a wireless communication, failures in a wireless communication apparatus occur, such as a decrease in a received signal level (RSL), an increase in bit errors and an interception of communication, due to causes such as natural phenomena and instrument faults. It is necessary to identify a failure cause in order to cope with a failure of the wireless communication because a coping process differs according to the failure cause.

In relation to the above-mentioned technique, for example, Patent Literature 1 discloses a wireless apparatus identifies a failure cause in a wireless link between the wireless apparatus and another wireless station to execute a countermeasure. The wireless apparatus according to Patent Literature 1 acquires characteristic values of statistical information representing a state of the wireless link and detects a plurality of failure causes previously related to the statistical information, in a prescribed order based on the characteristic values. Further, the wireless apparatus according to Patent Literature 1 executes the countermeasure previously related to the detected failure cause. In Patent Literature 1, the plurality of failure causes include the existence of shadowing, the existence of radio wave noise, the existence of multipath fading, the existence of congestion and the existence of hidden terminals. The detection in the prescribed order means the following order: the detection of the existence of the shadowing, the detection of the existence of the radio wave noise, the detection of the existence of multipath fading, the detection of the existence of congestion, and finally the detection of the existence of hidden terminals.

Further, for example, Patent Literature 2 discloses a space diversity in-phase combining board (SD COMB board) used for a multiplex wireless apparatus in which the board detects whether an instrument abnormality or a line abnormality has occurred and transmits a notification. The SD COMB board includes first and second signal distributors that distribute (i.e., divide) input signal into two signals, a phase shifter that coordinates the phase of the input signal based on a control signal, first and second AGC amplifiers that perform gain control so that amplitude becomes constant and a phase comparison mixer that multiplies the output signal of the first AGC amplifier by the output signal of the second AGC amplifier and outputs a phase comparison result signal indicating a phase difference. Moreover, the SD COMB board includes a control circuit that outputs a control signal in accordance with the phase comparison result signal, first and second detection circuits that output first and second detection signals indicating presence or absence of input signals, a third detection circuit that detects an instrument abnormality and an input signal abnormality based on the phase comparison result signal, the first detection signal and second detection signal, and an alarm means that displays the instrument abnormality or the input signal abnormality based on the detection result of the third detection circuit.

CITATION LIST

Patent Literature

Patent Literature 1: Japanese Unexamined Patent Application Publication No. 2012-74765
Patent Literature 2: Japanese Unexamined Patent Application Publication No. 2001-86047

SUMMARY OF INVENTION

Technical Problem

One of the failure causes includes a fading that occurs on the wireless line due to natural phenomena and the like. Regarding the fading, there are a plurality of types of fading, such as interference fading (multipath fading or frequency selective fading), attenuation fading (flat fading) and duct type fading.

Interference fading is a phenomenon in which frequency interference, where a direct wave and a reflected wave interfere with each other by reflection, refraction or the like due to fluctuation in K values (effective Earth-radius factor), occurs. Attenuation fading is a phenomenon where insufficient clearance between the radio wave and the earth or the like due to fluctuation in K values attenuates radio waves and thereby it is impossible to ensure sufficient RSL. Duct type fading is a phenomenon where insufficient clearance and frequency interference occur at the same time due to a violent fluctuation in K values. The coping processes for the interference fading, the attenuation fading and the duct type fading differ from each other.

It is necessary to analyze the history data in an artificial manner by a user in order to distinguish (i.e., identify) the type of fading. The amount of the history data is enormous and it is necessary to analyze a plurality of parameters in order to distinguish the type of fading. Therefore, the artificial manner of analyzing the history data requires complicated operations and a huge amount of time. Additionally, there is a possibility that a human error may occur due to the analyzing being done by a user.

Patent Literature 1 discloses a technique for detecting the existence of shadowing, the existence of radio wave noise, the existence of multipath fading, the existence of congestion and the existence of hidden terminals as a plurality of failure causes. However, although Patent Literature 1 discloses that occurrence of fading is detected, Patent Literature 1 does not disclose detecting which type of fading among a plurality of types of fading the occurring fading is. Therefore, it is impossible to distinguish the type of fading by the technique of Patent Literature 1. Further, Patent Literature 2 only discloses a technique for detecting an instrument abnormality and an input signal abnormality according to the presence or absence of input signals and a phase difference of the input signal in the SD COMB board, and therefore, it is impossible to distinguish the type of fading.

The present invention is provided for solving the above problems and an object of the present invention is to provide a monitoring apparatus, a wireless communication system, a failure-cause distinguishing method, and a non-transitory computer readable medium storing a program that enable a user to appropriately cope with fading.

Solution to Problem

A first monitoring apparatus according to the present invention includes: acquisition means for acquiring history data generated in one or more wireless communication apparatuses, the history data indicating at least information related to the time at which failures have occurred in each predetermined time period and related to a received signal level therein; and distinguishing means for distinguishing a type of fading that has occurred in wireless lines related to the wireless communication apparatuses based on the history data.

Further, a second monitoring apparatus according to the present invention includes: display means for displaying a type of fading that has occurred in wireless lines related to one or more wireless communication apparatuses from history data generated in the wireless communication apparatuses, the history data indicating at least information related to failures.

Further, a method for distinguishing a failure cause according to the present invention includes: acquiring history data generated in one or more wireless communication apparatuses, the history data indicating at least information related to the time at which failures have occurred in each predetermined time period and related to a received signal level therein; and distinguishing a type of fading that has occurred in the wireless lines related to the wireless communication apparatuses based on the history data.

Further, a wireless communication system according to the present invention includes: one or more wireless communication apparatuses; acquisition means for acquiring history data generated in the wireless communication apparatuses, the history data indicating at least information related to the time at which failures have occurred in each predetermined time period and related to a received signal level therein; and distinguishing means for distinguishing a type of fading that has occurred in the wireless lines related to the wireless communication apparatuses based on the history data.

Further, a program according to the present invention causes a computer to execute: a step of acquiring history data generated in one or more wireless communication apparatuses, the history data indicating at least information related to the time at which failures have occurred in each predetermined time period and related to a received signal level therein; and a step of distinguishing a type of fading that has occurred in wireless lines related to the wireless communication apparatuses based on the history data.

Advantageous Effects of Invention

According to the present invention, it is possible to provide a monitoring apparatus, a wireless communication system, a failure-cause distinguishing method, and a non-transitory computer readable medium storing a program that enable a user to appropriately cope with fading.

BRIEF DESCRIPTION OF DRAWINGS

FIG. 8 shows an example of a failure cause list displayed by the distinguishing-result display unit according to the first exemplary embodiment;
FIG. 9 shows an example of an apparatus-specific list displayed by the distinguishing-result display unit according to the first exemplary embodiment.

DESCRIPTION OF EMBODIMENTS

Outline of Exemplary Embodiment

Figure 1:
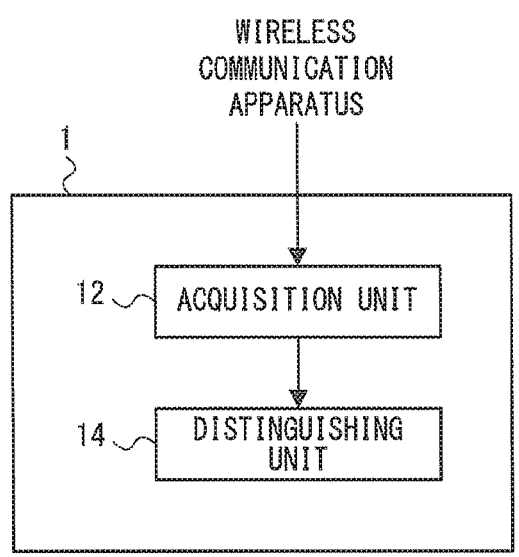
FIG. 1 shows an outline of a monitoring apparatus according to an exemplary embodiment.

Prior to giving an explanation of exemplary embodiments, an outline of an exemplary embodiment is explained with reference to FIG. 1. FIG. 1 shows an outline of a monitoring apparatus 1 according to an exemplary embodiment. As shown in FIG. 1, the monitoring apparatus 1 includes an acquisition unit 12 (acquisition means) and a distinguishing unit 14 (distinguishing means). The acquisition unit 12 acquires history data which is generated in one or more wireless communication apparatuses and which indicates at least information related to the time at which failures have occurred in each predetermined time period and related to received signal level therein. The distinguishing unit 14 distinguishes (i.e., identifies) the type of fading that has occurred in the wireless lines related to the wireless communication apparatuses based on the history data. Preferably, "the time at which failures have occurred" includes a first failure occurrence time at which a first failure has occurred and a second failure occurrence time at which a second failure of a degree which is higher than a degree of the first failure has occurred. The "first failure", for example, may be occurrence of bit errors, as described below. The "second failure", for example, may be that wireless communication is impossible, as described below.

According to the monitoring apparatus 1 according to the exemplary embodiment, it is possible to distinguish the type of fading that has occurred in the wireless line. Accordingly, it is possible to perform a coping process appropriate to the type of fading. Note that the acquisition unit 12 and the distinguishing unit 14 may be respectively provided in different apparatuses that are physically separated from each other. Further, it is also possible to distinguish the type of fading that has occurred in the wireless line, according to a failure-cause distinguishing method including processes performed by each component in the monitoring apparatus 1.

First Exemplary Embodiment

Exemplary embodiments according to the present invention are explained hereinafter with reference to the drawings.

Figure 2:
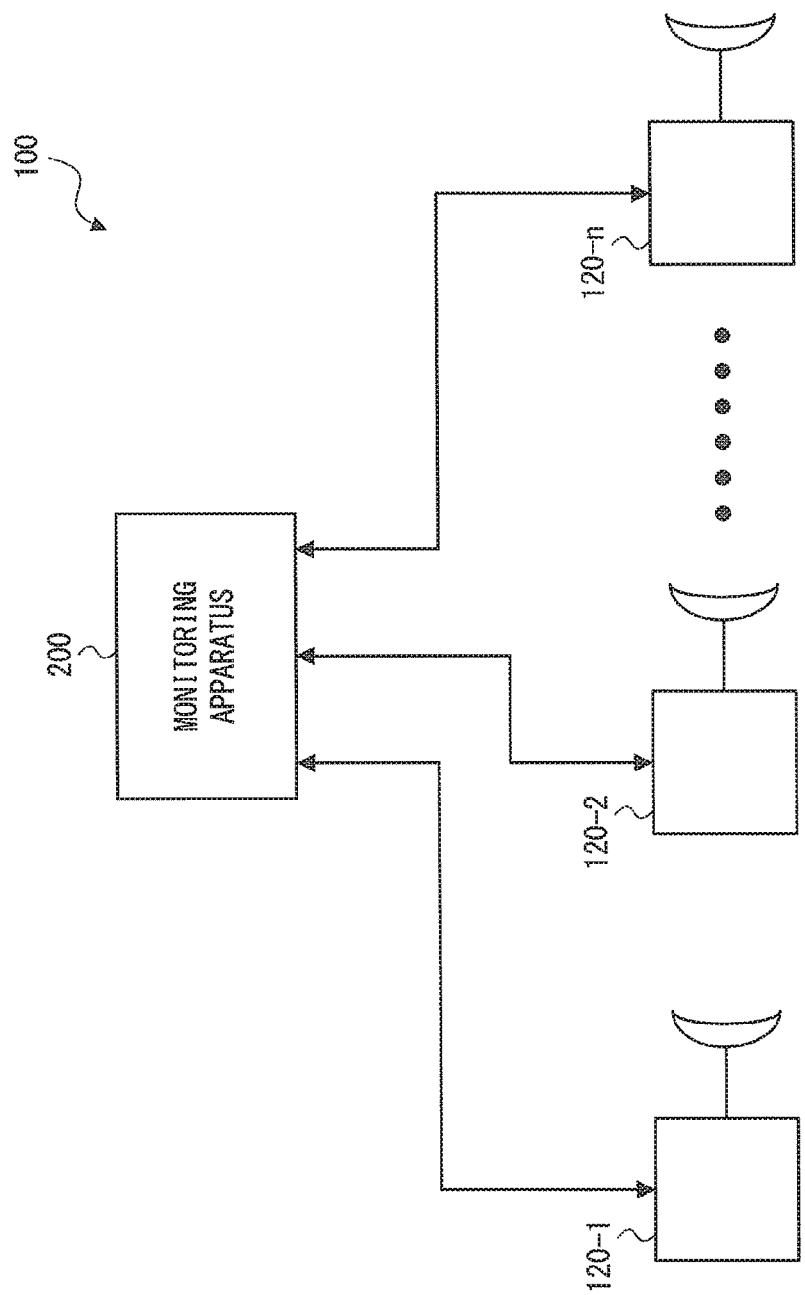
FIG. 2 shows a wireless communication system according to a first exemplary embodiment.

FIG. 2 shows a wireless communication system 100 according to a first exemplary embodiment. The wireless communication system 100 includes wireless communication apparatuses 120-1 to 120-$n$ ($n$ is an integer greater than or equal to one) and a monitoring apparatus 200 (corresponding to the monitoring apparatus 1). Note that the wireless communication apparatuses 120-1 to 120-$n$ are collectively referred to as the wireless communication apparatus 120 when each of them is explained without distinction.

The wireless communication apparatus 120 (e.g., a wireless communication apparatus 120-1) performs wireless communication with another wireless communication apparatus 120 (e.g., a wireless communication apparatus 120-2) via the wireless line. The monitoring apparatus 200 includes functions of the monitoring apparatus 1 shown in FIG. 1. The monitoring apparatus 200 monitors capability, wireless line quality and operating status (i.e., performances) for the wireless communication apparatuses 120-1 to 120-$n$. That is, the monitoring apparatus 200 monitors the history data indicating the performances of the wireless communication apparatuses 120-1 to 120-$n$.

Figures 3, 4:
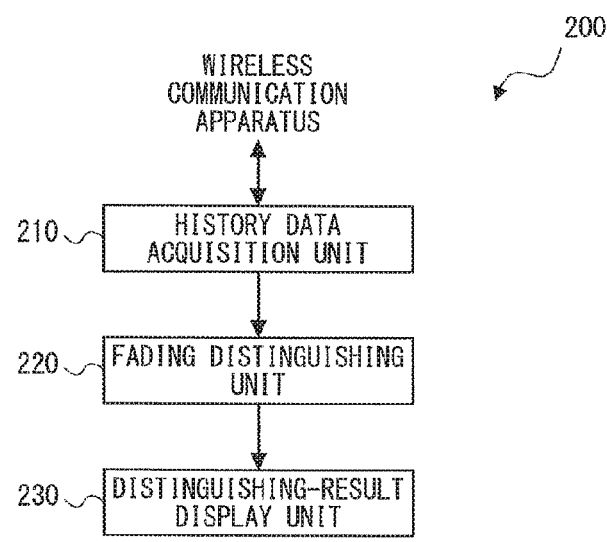
FIG. 3 shows an example of the history data generated by the wireless communication apparatus according to the first exemplary embodiment.
FIG. 4 is a functional block diagram showing a configuration of the monitoring apparatus according to the first exemplary embodiment.

The wireless communication apparatus 120 generates the history data, shown in FIG. 3 as an example, for each predetermined period. The history data is a performance monitoring data (PM data) indicating the capability, the operating status or the like related to each wireless communication apparatus 120. The wireless communication apparatus 120 measures the data (performance parameter) indicating the capability, the wireless line quality, the operating status and the like, for each predetermined period. Further, the wireless communication apparatus 120 generates a period file including measured values measured at that period.

FIG. 3 shows an example of the history data generated by the wireless communication apparatus 120. In the example shown in FIG. 3, for each fifteen-minute period (i.e., period of fifteen minutes) defined in ITU-T (International Telecommunication Union Telecommunication Standardization Sector), the period file (fifteen-minute file) is generated. The period file includes at least error time (the first failure occurrence time), non-operating time (second failure occurrence time), RSLmin and RSLmax. In other words, the wireless communication apparatus 120 measures at least the error time, the non-operating time, the RSLmin and the RSLmax for each fifteen-minute period.

The error time Te (s) is a time in which an error has occurred in the data received by the wireless communication in a period of fifteen minutes. For example, the error time may be a time in which bit error rate (BER) exceeds the predetermined threshold value. Further, the error time may be, for example, SES (Severely Errored Seconds) or SEP (Severely Errored Period), which are defined by the ITU-T, and may be the total time of this SES and SEP.

The non-operating time Tu (s) is a time in which the wireless communication apparatus 120 could not perform wireless communication, in a period of fifteen minutes, because the wireless line has been disconnected. For example, the non-operating time may be UAS (Unavailable Seconds) defined by the ITU-T. Note that the error time and the non-operating time are not counted redundantly.

The error time Te and the non-operating time Tu indicate the times in which some failures have occurred. That is, the error time Te is the time in which the failure of data error (bit error, etc.) has occurred. The non-operating time Tu is the time in which the failure that the wireless communication is impossible has occurred. Note that the degree of the failure that the wireless communication is impossible is higher than the degree of the failure of the data error. Further, a failure occurrence time Tf may be defined as the sum of the error time Te and the non-operating time Tu (i.e., Tf=Te+Tu).

The RSLmin (dBm) is the minimum value of the RSL in a period of fifteen minutes. Further, the RSLmax (dBm) is the maximum value of RSL in the period of fifteen minutes. In other words, the RSLmin and RSLmax are information related to the received signal level.

Moreover, the wireless communication apparatus 120 generates the period file including these above measured values for each period of fifteen minutes. In the example shown in FIG. 3, the period files generated at 7:00 on Jan. 1, 2014, generated at 7:15 on Jan. 1, 2014, generated at 7:30 on Jan. 1, 2014, etc. are shown. For example, the period file generated at 7:00 on Jan. 1, 2014 includes the error time, the non-operating time, the RSLmin and the RSLmax, which have been measured in a fifteen-minute period of 6:45 to 7:00 on Jan. 1, 2014.

FIG. 4 is a functional block diagram showing a configuration of the monitoring apparatus 200 according to the first exemplary embodiment. The monitoring apparatus 200 includes a history data acquisition unit 210, a fading distinguishing unit 220 and a distinguishing-result display unit 230 (display means). The monitoring apparatus 200 distinguishes the type of fading that has occurred in the wireless line related to the wireless communication apparatus 120, by means of these above components. Furthermore, the monitoring apparatus 200 displays the distinguished type of fading on a display screen of a monitor or the like. Note that the monitoring apparatus 200 may include a function as a computer as well as the components shown in FIG. 4. That is, the monitoring apparatus 200 may include an arithmetic device (i.e., processor) such as a CPU (Central Processing Unit), a storage device such as a memory, a communication device that performs communication with anther apparatus such as the wireless communication apparatus 120, an input device such as a keyboard and mouse, and an output device such as a monitor.

The history data acquisition unit 210 corresponds to the acquisition unit 12 shown in FIG. 1. The history data acquisition unit 210 acquires the history data shown in FIG. 3 from the wireless communication apparatuses 120-1 to 120-$n$, respectively, and outputs them to the fading distinguishing unit 220. Specifically, the history data acquisition unit 210 accesses the wireless communication apparatuses 120-1 to 120-$n$, respectively, at a predetermined time of a day (e.g., 24:00) to acquire the history data generated by the wireless communication apparatuses 120-1 to 120-*n*, respectively. At this time, the history data acquisition unit 210 may control the communication device installed in the monitoring apparatus 200 to acquire the history data.

The fading distinguishing unit 220 corresponds to the distinguishing unit 14 shown in FIG. 1. The fading distinguishing unit 220 uses the history data, which is acquired by the history data acquisition unit 210, related to each wireless communication apparatus 120 to distinguish (i.e., identify) the type of fading that has occurred in the wireless line related to each wireless communication apparatus 120. Further, the fading distinguishing unit 220 outputs the data indicating the distinguishing-result to the distinguishing-result display unit 230. Details of this are described later.

Now, the principle for the fading distinguishing unit 220 distinguishing the type of fading is explained with reference to FIG. 5.

Figure 5:
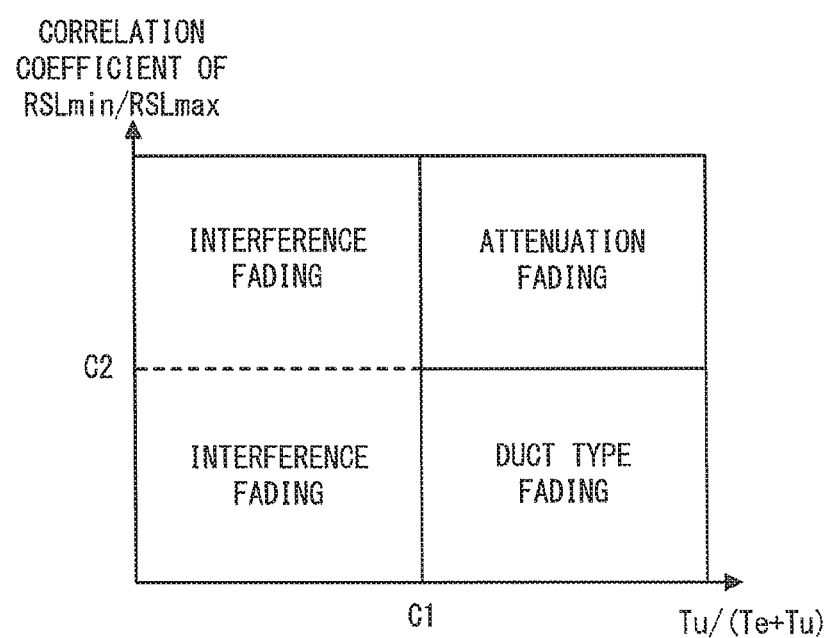
FIG. 5 is a diagram showing the relationship between each type of fading and its characteristics, according to the first exemplary embodiment.

FIG. 5 is a diagram showing the relationship between each type of fading and its characteristics. When the interference fading occurs, a ratio of the error time Te to the failure occurrence time Tf (i.e., the sum of the error time Te and the non-operating time Tu) tends to become higher. Conversely, when the interference fading occurs, a ratio of the non-operating time Tu to the failure occurrence time Tf becomes lower. Therefore, when Tu/(Te+Tu)≤C1, the fading distinguishing unit 220 determines that interference fading has occurred. The C1 (first value) is a predetermined value, and, for example, C1=0.3.

Further, when attenuation fading occurs, a ratio of the non-operating time Tu to the failure occurrence time Tf becomes higher. Furthermore, because the RSL absolutely decreases due to the attenuation of radio waves, both the RSLmin and the RSLmax decrease in a correlated way. Therefore, when Tu/(Te+Tu)>C1 and the correlation coefficient between the RSLmin and the RSLmax is greater than C2, the fading distinguishing unit 220 determines that attenuation fading has occurred. The C2 (second value) is a predetermined value, and, for example, C2=0.

Moreover, when the duct type fading occurs, a ratio of the non-operating time Tu to the failure occurrence time Tf becomes higher. Furthermore, because the RSL wildly fluctuates, the RSLmin and the RSLmax are inversely correlated with each other. Therefore, when Tu/(Te+Tu)>C1 and the correlation coefficient between the RSLmin and the RSLmax is equal to or less than C2, the fading distinguishing unit 220 determines that duct type fading has occurred.

Figure 6:
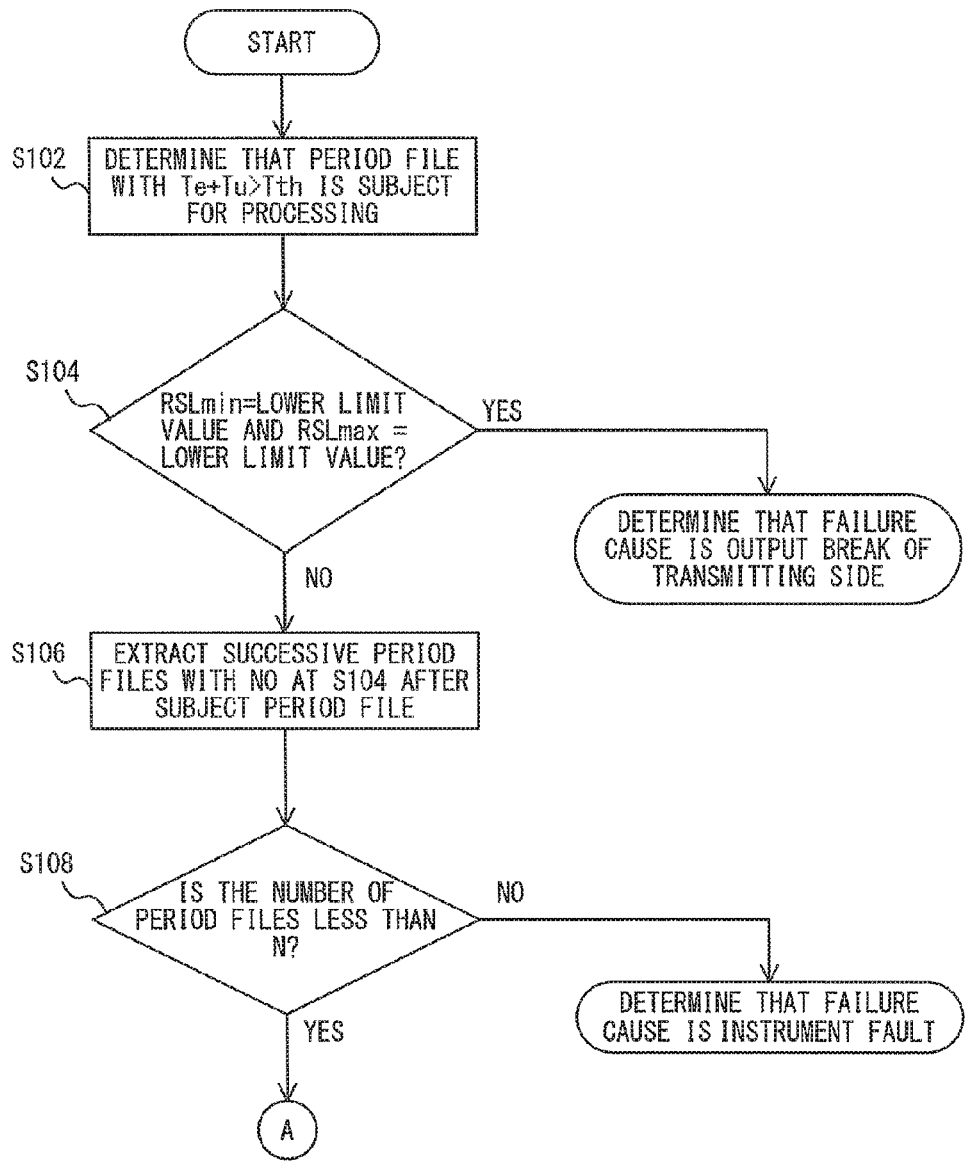
FIG. 6 is a flowchart showing a process performed by the fading distinguishing unit according to the first exemplary embodiment.
Figure 7:
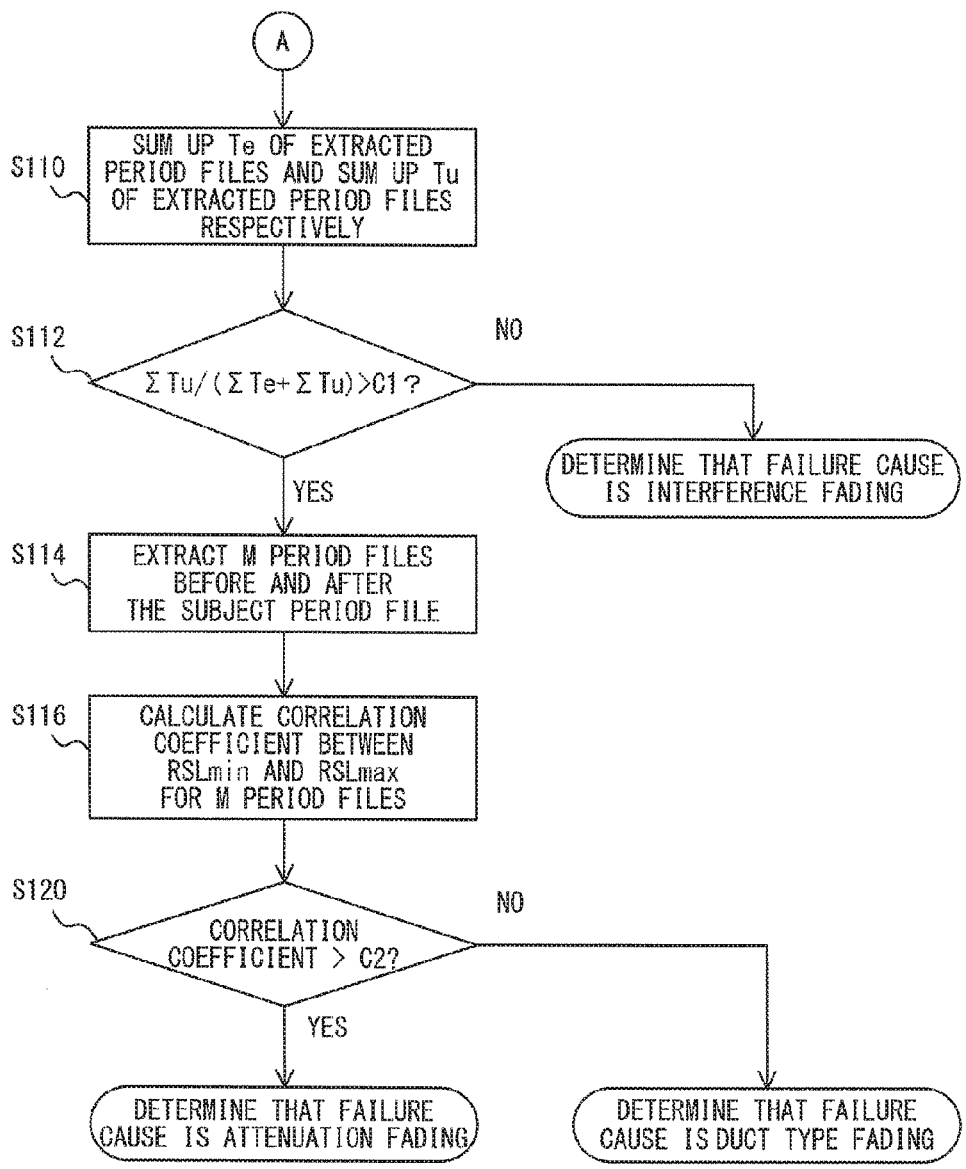
FIG. 7 is a flowchart showing a process performed by the fading distinguishing unit according to the first exemplary embodiment.

FIGS. 6 and 7 are flowcharts showing a process performed by the fading distinguishing unit 220. The fading distinguishing unit 220 performs the process of the flowcharts shown in FIGS. 6 and 7, for each of the wireless communication apparatus 120-1 to 120-*n*.

The fading distinguishing unit 220 extracts, from the history data, the period file in which the sum of the error time Te and the non-operating time Tu is greater than a predetermined threshold time Tth among the period files, and determines that the extracted period file is a subject for distinguishing the type of fading. That is, the fading distinguishing unit 220 determines that the period file with Te+Tu>Tth is a subject for processing (S102). The Tth is a time period in which failure causes would have occurred such as fading, and may be, for example, twenty seconds. This Tth can be set as appropriate by a user.

Next, the fading distinguishing unit 220 determines whether, for the period file to be a subject (hereinafter, "subject period file"), the RSLmin is a lower limit value and the RSLmax is the lower limit value (S104). The "lower limit value" is a value that is set for each wireless communication apparatus 120 and the RSLs are never lower than the lower limit value.

The case where the RSLmin is the lower limit value and the RSLmax is the lower limit value (YES at S104), i.e., both the RSLmin and the RSLmax are the lower limit value means that no wireless signal is transmitted from the wireless communication apparatus 120 of a transmitting side. Therefore, in this case, the fading distinguishing unit 220 determines that the failure cause is a break of the output of the wireless communication apparatus 120 of a transmitting side.

When at least one of the RSLmin and the RSLmax is not the lower limit value (NO at S104), the fading distinguishing unit 220 extracts the successive period files in which the processing result at S104 is NO, after the subject period file for processing (S106). For example, when the period file "2014/01/01_7:00" shown in FIG. 3 is the subject for processing, the fading distinguishing unit 220 extracts the successive period files subsequent to it in which Te+Tu>Tth and at least one of the RSLmin and the RSLmax is not the lower limit value. For example, when Te+Tu>Tth and at least one of the RSLmin and the RSLmax is not the lower limit value in the period files "2014/01/01_7:15" to "2014/01/01_8:00", the fading distinguishing unit 220 extracts these consecutive period files. Additionally, when Te+Tu>Tth does not hold in the period file "2014/01/01_8:15", the fading distinguishing unit 220 terminates the extraction processing.

Then, the fading distinguishing unit 220 determines whether the number of the extracted period files is less than N (N is an integer greater than or equal to two) (S108). When the number of the extracted period files is equal to or more than N (NO at S108), the fading distinguishing unit 220 determines that the failure cause is an instrument fault (a fault of the wireless communication apparatus 120 to be a subject for distinguishing). Note that N is a value in which the failure cause may be estimated to be the instrument fault when period files consecutively N times indicate the occurrence of the failure causes. In other words, when period files indicate the occurrence of the failure causes continuously for N*15 (minutes), the failure cause is estimated to be the instrument fault since there are very few natural phenomena that occur continuously for N*15 (minutes). For example, since there are very few natural phenomena that occur continuously for six hours (15 minutes*24), N=24 can hold. The N can be set as appropriate by a user. The "instrument fault" includes a case where the direction of antennas of the wireless communication apparatus 120 becomes out of alignment due to a gust or the like.

When the number of the period files is less than N (YES at S108), the fading distinguishing unit 220 sums up the error times Te of the period files extracted by the processing at S108 and sums up the non-operating times Tu of the period files extracted by the processing at S108, respectively (S110). For example, when the period files "2014/01/01_7:00" to "2014/01/01_8:00" are extracted, the fading distinguishing unit 220 sums up the error times Te of the period files "2014/01/01_7:00" to "2014/01/01_8:00". Similarly, the fading distinguishing unit 220 sums up the non-operating times Tu of the period files "2014/01/01_7:00" to "2014/01/01_8:00". Note that ΣTe is the total value of the error time Te and ΣTu is the total value of the non-operating time Tu.

Next, the fading distinguishing unit 220 determines whether a ratio of the non-operating time Tu to the sum of the error time Te and the non-operating time Tu is greater than the predetermined value C1 (S112). Specifically, the fading distinguishing unit 220 determines whether a ratio of the total value ($\Sigma Tu$) of the non-operating time Tu to the total value ($\Sigma Te+\Sigma Tu$) of the $\Sigma Te$ and the $\Sigma Tu$ is greater than C1. When a ratio of the non-operating time Tu to the sum of the error time Te and the non-operating time Tu is equal to or less than C1, i.e., $\Sigma Tu/(\Sigma Te+\Sigma Tu) \leq C1$ (NO at S112), the fading distinguishing unit 220 determines that the interference fading has occurred, as mentioned above with reference to FIG. 5. Note that the "interference fading" includes the possibility of frequency interference or radio wave deterioration due to twisting of towers.

On the other hand, when a ratio of the non-operating time Tu to the sum of the error time Te and the non-operating time Tu is greater than C1, i.e., $\Sigma Tu/(\Sigma Te+\Sigma Tu)>C1$ (YES at S112), the fading distinguishing unit 220 extracts a total of M (M is an integer greater than or equal to two) period files before and after the bject period file (S114). M may be a value corresponding to the adequate number of samples when the correlation coefficient is calculated in the processing at S116 described below. For example, if M=24, the period files for the three hours (15 minutes*12) before the subject period file and for the three hours (15 minutes*12) after the subject period file are extracted. For example, when the subject period file is "2014/01/01_7:00", the fading distinguishing unit 220 extracts a total of twenty-four period files, which are the period files up to three hours before this period file (i.e., subject period file) and the period files up to three hours after this period file. This M can be set as appropriate by a user.

Next, the fading distinguishing unit 220 calculates, for M period files, the correlation coefficient indicating the correlation between the RSLmin and the RSLmax (S116). Specifically, the fading distinguishing unit 220 calculates the correlation coefficient between the RSLmin for M period files (i.e., M RSLmin values) and the RSLmax for M period files (i.e., M RSLmax values).

For example, it is assumed that the period file "2014/01/01_7:00" is the period file to be a subject for processing. In this case, a total of twenty-four period files, which are the period files up to three hours before 7:00 on Jan. 1, 2014 and the period files up to three hours after 7:00 on Jan. 1, 2014, are defined as period files #1 to #24, respectively. The RSLmin of the period files #1 to #24 are defined as RSLmin #1 to RSLmin #24, respectively. The RSLmax of the period files #1 to #24 are defined as RSLmax #1 to RSLmax #24, respectively. In this case, the fading distinguishing unit 220 calculates the correlation coefficient between RSLmin #1 to RSLmin #24 and RSLmax #1 to RSLmax #24.

Then, the fading distinguishing unit 220 determines whether the calculated correlation coefficient is greater than C2 (S120). When the correlation coefficient is greater than C2 (YES at S120), the fading distinguishing unit 220 determines that attenuation fading has occurred, as mentioned above with reference to FIG. 5. On the other hand, when the correlation coefficient is equal to or less than C2 (NO at S120), the fading distinguishing unit 220 determines that duct type fading has occurred, as mentioned above with reference to FIG. 5. Note that the "attenuation fading" includes the possibility of radio wave deterioration due to rainfall.

The fading distinguishing unit 220 performs the above-mentioned processing for each period file included in the history data acquired by the history data acquisition unit 210.

In this way, since the fading distinguishing unit 220 distinguishes the type of fading, a user can execute a coping process appropriate to each fading. Accordingly, it is possible to enhance the benefit of the coping.

Note that the respective examples of the coping process for each fading are countermeasures shown below. It is possible to suppress failure due to fading more reliably by a user applying the coping process as below for each fading.

Figure 10:
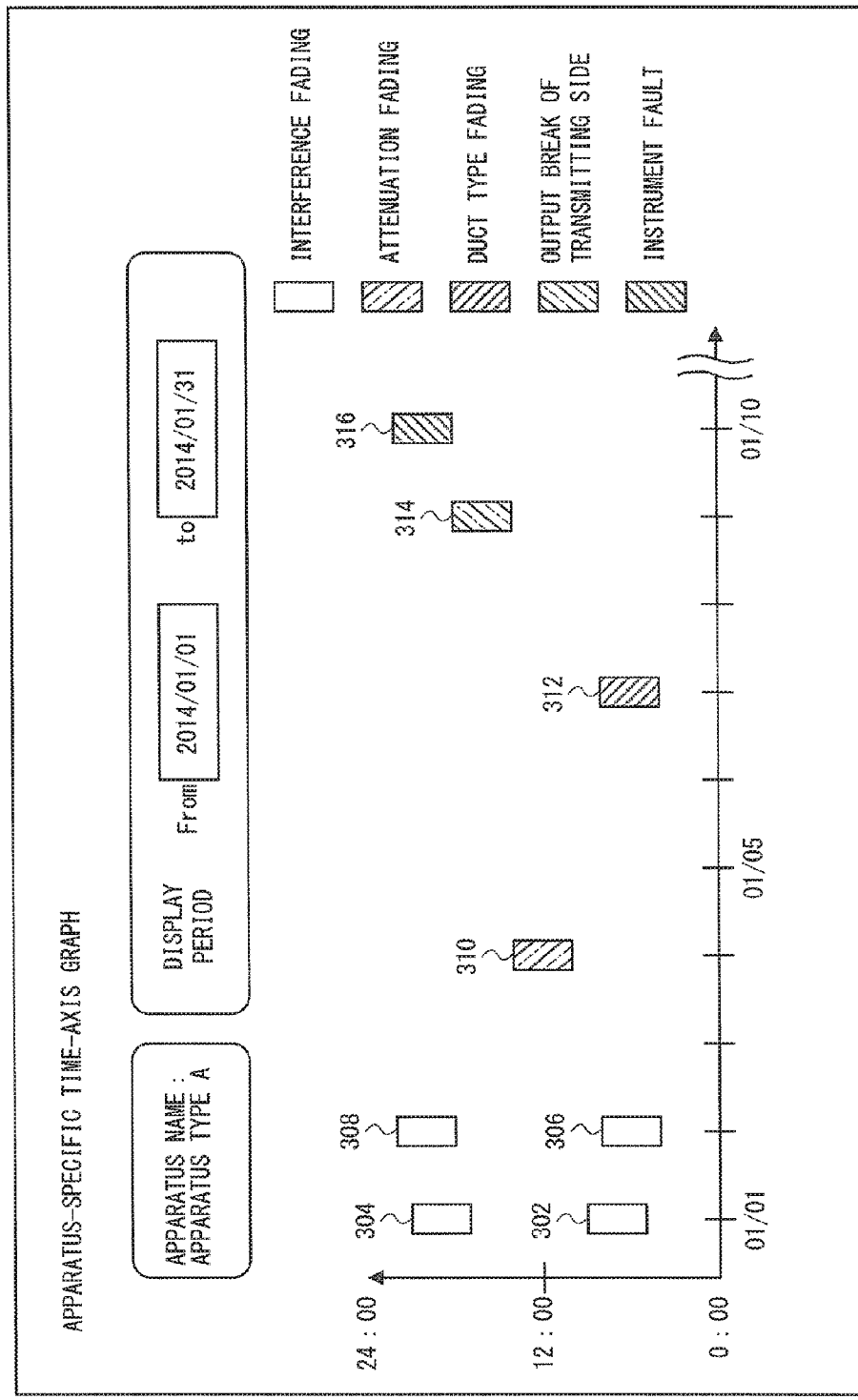
FIG. 10 shows an example of an apparatus-specific time-axis graph displayed by the distinguishing-result display unit according to the first exemplary embodiment.

Interference Fading:
   Adaptation of antenna tilt-up
   Adaptation of space diversity (SD)
   Readjustment of antenna spacing between Main and SD
   Change of frequency band Attenuation Fading:
   Shift of antennas to higher positions
   Adaptation of large size antenna
   Introduction of a repeater to shorten a propagation channel Duct Type Fading:
   Shift of antennas to higher positions
   Adaptation of large size antenna and antenna tilt-up
   Introduction of a repeater at a higher place to shorten a propagation channel and to make a vertical interval of the propagation channel
   Change of route between the wireless communication apparatuses The distinguishing-result display unit 230 causes a display device in the monitoring apparatus 200 or another apparatus to display the distinguishing-result obtained by the fading distinguishing unit 220. Specifically, the distinguishing-result display unit 230 displays, on the display device, display screen images as shown in, for example, FIGS. 8 to 10 as an example. The display device is, for example, a monitor or the like. Further, the display device may be a GUI (Graphical User Interface). That is, the display device may be integrated with an input device such as a mouse and may be a touch panel or a touch screen or the like. Note that the screen images illustrated in FIGS. 8 to 10 are independent from each other and do not necessarily correspond to each other.

FIG. 8 shows an example of a failure cause list displayed by the distinguishing-result display unit 230. The failure cause list shows what failure cause has occurred and for how long a time the failure cause has occurred in a display period set by a user, for each apparatus. In the example shown in FIG. 8, the display period is a period from Jan. 1, 2014 to Jan. 31, 2014. Each of apparatuses A to E corresponds to any one of the wireless communication apparatus 120-1 to 120-n.

In the example shown in FIG. 8, regarding the apparatus A, for example, it is shown that the "interference fading" has occurred for a total of sixty minutes in the above-mentioned period. Similarly, regarding the apparatus E, it is shown that the "transmitting-side output break" has occurred for a total of ninety minutes and the "instrument fault" has occurred for a total of thirty minutes, in the above-mentioned period. In this manner, the distinguishing-result display unit 230 performs the display of the failure cause list and hence a user can instantly confirm in which wireless communication apparatus 120 a failure cause has occurred and what failure cause has occurred.

FIG. 9 shows an example of an apparatus-specific list displayed by the distinguishing-result display unit 230. The apparatus-specific list shows the failure causes that have occurred for an apparatus selected by a user with a time series. The apparatus-specific list may be displayed by touching or clicking the position of the "apparatus A" in FIG. 8, for example.

In the example in FIG. 9, it is shown that the interference fading has occurred in a period of fifteen minutes between 8:00 and 8:15 on Jan. 1, 2014. Similarly, it is shown that the interference fading has occurred in a period of thirty minutes between 20:00 and 20:30 on Jan. 1, 2014. In a similar way, it is shown that the attenuation fading has occurred in a period of fifteen minutes between 12:15 and 12:00 on Jan. 4, 2014. In this manner, the distinguishing-result display unit 230 performs the display of the apparatus-specific list and hence a user can instantly confirm when and for how long fading has occurred and what fading has occurred, for the selected wireless communication apparatus 120.

FIG. 10 shows an example of an apparatus-specific time-axis graph displayed by the distinguishing-result display unit 230. The apparatus-specific time-axis graph shows the apparatus-specific list shown in FIG. 9 by using a graph. In the apparatus-specific time-axis graph, the horizontal axis represents date and the vertical axis represents time (i.e., clock time) in a day and the apparatus-specific time-axis graph shows what failure cause has occurred and in which time zone the failure cause has occurred, by using bars 302 to 316. The bars 302 to 316 are each indicated with a different color coding for each corresponding failure cause. Note that the longitudinal length of the bars 302 to 316 may correspond to a period in which the corresponding failure cause has occurred.

In the example in FIG. 10, it is shown that the interference fading has occurred in the morning (dawn) and in the afternoon (nightfall) of January 1, as indicated respectively by the bar 302 and the bar 304. Similarly, it is shown that the interference fading has occurred in the morning (dawn) and in the afternoon (nightfall) of January 2, as indicated respectively by the bar 306 and the bar 308. Further, it is shown that the attenuation fading has occurred in the daytime of January 4, as indicated by the bar 310. Moreover, it is shown that the duct type fading has occurred in morning (dawn) of January 7, as indicated by the bar 312. Furthermore, it is shown that the transmitting-side output break has occurred in the afternoon of January 9, as indicated by the bar 314. Additionally, it is shown that the instrument fault has occurred in the afternoon (nightfall) of January 10, as indicated by the bar 316.

In this manner, the distinguishing-result display unit 230 displays the apparatus-specific time-axis graph and hence a user can visually confirm in a moment in which time zone each failure cause has occurred in a day. Note that a time zone in a day in which the fading due to natural phenomena is likely to occur is basically stable. For example, the interference fading tends to be likely to occur at dawn and at nightfall due to atmospheric conditions (such as temperature and humidity) and the like. Accordingly, when it is shown that the interference fading has occurred at dawn and at nightfall as illustrated in FIG. 10, a user can recognize that this fading has occurred due to natural phenomena. On the other hand, when it is shown that the fading has occurred in the daytime, it is assumed that the fading has occurred due to a cause other than natural phenomena. Therefore, a user can perform a process for coping with a cause other than natural phenomena.

Further, the distinguishing-result display unit 230 may display a coping process corresponding to each of the bars 302 to 316 by using pop-up when a mouse cursor (pointer), is hovered over each of the bars 302 to 316. For example, when the mouse cursor is hovered over the bars 302, the above-mentioned processes for coping with the interference fading are displayed. Accordingly, a user can immediately recognize a process for coping with each failure cause.

Further, the distinguishing-result display unit 230 may display the history data (performance parameters) corresponding to each of the bars 302 to 316 in a graphic form when each of the bars 302 to 316 is clicked. For example, by clicking the bar 302, the graph (line graph, etc.) is shown which indicates changes of the error time Te, the non-operating time Tu, RSLmin and RSLmax in the period that corresponds to the bar 302. Accordingly, a user can easily visually recognize the actual history data for the period in which the failure cause has occurred.

Modified Example

Note that the present invention is not limited to the aforementioned exemplary embodiments and may be changed as appropriate without departing from the spirit of the present invention. For example, the order of processes (steps) in the above-described flowchart can be changed as appropriate. Further, at least one of a plurality of processes (steps) may be omitted.

For example, the process in S110 may be omitted. Further, in the process in S122, the fading distinguishing unit 220 performs the determination process using the total value $\Sigma$Te of the error time Te and the total value $\Sigma$Tu of the non-operating time Tu. However, the total values may not be used. That is, the fading distinguishing unit 220 may determine whether, for the period file to be a subject for processing, a ratio of the non-operating time Tu to the sum of the error time Te and the non-operating time Tu is greater than the predetermined value C1. This enables the process to be simplified. However, it is possible to distinguish the type of fading more accurately by using the total values.

Further, in the above-described exemplary embodiment, the fading distinguishing unit 220 determines that the interference fading has occurred when a ratio of the non-operating time Tu to the sum of the error time Te and the non-operating time Tu is equal to or less than the predetermined value C1, in the process in S112. However, the present invention is not limited to this process. The fading distinguishing unit 220 may determine that the interference fading has occurred when a ratio of the "error time Te" to the sum of the error time Te and the non-operating time Tu is equal to or greater than a predetermined value.

Further, in the above-described exemplary embodiment, the fading distinguishing unit 220 distinguishes the type of fading using the correlation coefficient calculated in the process in S116, i.e., using the correlation coefficient calculated for the subject period file, in the process in S120. However, the present invention is not limited to this process. The fading distinguishing unit 220 may extract M period files in the process in S114, calculate the correlation coefficients in the process in S116, and calculate an average of the correlation coefficients for a plurality of the period files after the subject period file (alternatively, before the subject period file, or before and after the subject period file) as well as the subject period file. Then the fading distinguishing unit 220 may use the calculated average of the correlation coefficients in the process in S120.

For example, when the period file "2014/01/01_7:15" in the example shown in FIG. 3 is the subject period file, the fading distinguishing unit 220 may not only calculate the correlation coefficient for M period files before and after the subject period file "2014/01/01_7:15", but also calculate the correlation coefficients for M period files before and after the subject period file "2014/01/01_7:30" and for M period files before and after the subject period file "2014/01/01_7:45" and calculate an average of the three calculated correlation coefficients. Accordingly, it is possible to distinguish the type of fading more accurately. Note that the average of the calculated correlation coefficients may be calculated when the subject period files are consecutively determined in the process in S102 and when the subject period files are consecutively determined as YES in the process in S112.

Further, in the above-described exemplary embodiment, the period related to the period files is fifteen minutes (defined in ITU-T). However, the period is not limited to fifteen minutes. The period related to the period files may be longer or shorter than fifteen minutes. Note that, because fading typically occurs in a short time, it is possible to determine the time when the fading has occurred more accurately by shortening the period related to the period files.

Further, M, which is the number of period files before and after the period file extracted in S114, is not limited to twenty four. When increasing the sample number M, it is possible to calculate a more accurate correlation coefficient. Note that in a case where the period for the period files as described above is shortened, even if samples of the period files for the three hours before the subject period file and for the three hours after the subject period file (i.e., samples of the period files for a total of six hours) are extracted in the same way as that of the above-described exemplary embodiment, it is possible to extract more samples of the period files than are extracted in the above-described exemplary embodiment.

Further, in the above-described exemplary embodiment, as shown in FIGS. 8 to 10 as an example, the distinguishing-result display unit 230 displays the interference fading, the attenuation fading, the duct type fading, the transmitting-side output break and the instrument fault, as the failure causes. However, the present invention is not limited to this configuration. The distinguishing-result display unit 230 may not display all of the above failure causes. The distinguishing-result display unit 230, for example, may not display the transmitting-side output break and the instrument fault.

Further, one wireless communication apparatus may be provided with a plurality of transceivers (modems). In this case, the wireless communication apparatus may generate the history data for each of a plurality of the transceivers. In this case, the monitoring apparatus may distinguish the failure cause for each of a plurality of transceivers. Further, in this case, the distinguishing-result display unit 230 may display the failure cause, which has occurred, for each of a plurality of the transceivers in the apparatus-specific list shown in FIG. 9 as an example. In the same manner, the distinguishing-result display unit 230 may display the apparatus-specific time-axis graphs shown in FIG. 10 as an example separately for each of a plurality of the transceivers.

Further, when the space diversity (SD) method is applied to the wireless communication apparatus and an SD antenna is provided in addition to a main antenna, the wireless communication apparatus may generate the history data separately for each of the main antenna and the SD antenna. In this case, the monitoring apparatus may distinguish the failure cause separately for each of the main antenna and the SD antenna. Further, in this case, the distinguishing-result display unit 230 may display the failure cause, which has occurred, separately for each of the main antenna and the SD antenna in the apparatus-specific list shown in FIG. 9 as an example. In the same manner, the distinguishing-result display unit 230 may display the apparatus-specific time-axis graphs shown in FIG. 10 as an example separately for each of the main antenna and the SD antenna.

Further, when N+1 method is applied to the wireless communication apparatus and a plurality of frequency channels are provided, the wireless communication apparatus may generate the history data separately for each frequency channel. In this case, the monitoring apparatus may distinguish the failure cause separately for each frequency channel. Further, in this case, the distinguishing-result display unit 230 may display the failure cause, which has occurred, separately for each frequency channel in the apparatus-specific list shown in FIG. 9 as an example. In the same manner, the distinguishing-result display unit 230 may display the apparatus-specific time-axis graphs shown in FIG. 10 as an example separately for each frequency channel.

Further, FIG. 10 shows a graph indicating what failure cause has occurred and in which time zone the failure cause has occurred only for the wireless communication apparatus 120 selected by a user. However, the present invention is not limited to this configuration. Along with the graph related to the selected wireless communication apparatus 120, a graph may be displayed for an opposite wireless communication apparatus 120 with which the selected wireless communication apparatus 120 performs communication. When some sort of failure cause has occurred for the selected wireless communication apparatus 120, the same failure cause generally occurs for the opposite wireless communication apparatus 120. On the other hand, when a failure cause different from that for the selected wireless communication apparatus 120 tends to occur for the opposite wireless communication apparatus 120, it is determined that another abnormality has occurred. Therefore, a user can distinguish a cause of failure more accurately by displaying the graph related to the selected wireless communication apparatus 120 and the graph related to the opposite wireless communication apparatus 120 side-by-side.

Further, the number of the monitoring apparatus is not limited to one and may be two or more. Further, in the above-described exemplary embodiment, the monitoring apparatus is configured as one apparatus. However, the present invention is not limited to this configuration. The monitoring apparatus may be configured so that the functions of the monitoring apparatus are distributed to a plurality of apparatuses connected to each other via a network such as the Internet, using a technique such as cloud computing or grid computing. For example, the monitoring apparatus may be configured so that one apparatus obtains the history data from the wireless communication apparatuses 120-1 to 120-$n$, another apparatus distinguishes the failure cause, and yet another apparatus displays the distinguishing-result. Further, yet another apparatus may set a value, such as "M", that a user can set as appropriate. Further, there may be a plurality of apparatuses that include same functions and a plurality of the apparatuses may implement one or more functions. The present invention includes this configuration.

Further, in the above-mentioned exemplary embodiments, the present invention has been explained as a hardware configuration, however the present invention is not limited thereto. In the present invention, the processing of each of the circuits in the monitoring apparatus can be realized by causing a CPU (Central Processing Unit) to execute a computer program.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present invention has been explained with reference to the exemplary embodiments, the present invention is not limited by above. Various modifications, obvious to those in the art, can be made to the configurations and details of the present invention within the scope of the invention.

The present application claims priority rights of and is based on Japanese Patent Application No. 2014-019928 filed on Feb. 5, 2014 in the Japanese Patent Office, the entire contents of which are hereby incorporated by reference.

REFERENCE SIGNS LIST

1 MONITORING APPARATUS
12 ACQUISITION UNIT
14 DISTINGUISHING UNIT
100 WIRELESS COMMUNICATION SYSTEM
120 WIRELESS COMMUNICATION APPARATUS
200 MONITORING APPARATUS
210 HISTORY DATA ACQUISITION UNIT
220 FADING DISTINGUISHING UNIT
230 DISTINGUISHING-RESULT DISPLAY UNIT

The invention claimed is:

1. A monitoring apparatus comprising:
acquisition unit that acquires history data generated in one or more wireless communication apparatuses, the history data indicating at least information related to the time at which failures have occurred in each predetermined time period and related to a received signal level therein; and
distinguishing unit that distinguishes a type of fading that has occurred in wireless lines related to the wireless communication apparatuses based on the history data, wherein
the time at which failures have occurred includes a first failure occurrence time at which a first failure has occurred and a second failure occurrence time at which a second failure of a degree which is higher than a degree of the first failure has occurred; and
the distinguishing unit determines that interference fading has occurred when a ratio of the second failure occurrence time to the sum of the first failure occurrence time and the second failure occurrence time is equal to or less than a predetermined first value.

2. The monitoring apparatus according to claim 1, wherein
the information related to the received signal level indicates a maximum value and a minimum value of the received signal level in each period; and
the distinguishing unit determines that attenuation fading has occurred when the ratio of the second failure occurrence time is greater than the first value and a correlation coefficient between the maximum value and the minimum value of the received signal level is greater than a predetermined second value, and determines that duct type fading has occurred when the correlation coefficient is equal to or less than the second value.

3. The monitoring apparatus according to claim 1, further comprising display unit that displays a distinguishing-result by the distinguishing unit.

4. The monitoring apparatus according to claim 3, wherein the display unit displays which type of fading has occurred for each wireless communication apparatus.

5. The monitoring apparatus according to claim 3, wherein the display unit displays which type of fading has occurred in each period.

6. The monitoring apparatus according to claim 3, wherein the display unit displays which type of fading has occurred at a certain time on a certain date, in a graph with an axis indicating date and an axis indicating time on the date.

7. A monitoring apparatus comprising:
display unit that displays a type of fading that has occurred in wireless lines related to one or more wireless communication apparatuses from history data generated in the wireless communication apparatuses, the history data indicating at least information related to failures.

8. The monitoring apparatus according to claim 7, wherein the display unit displays which type of fading has occurred for each wireless communication apparatus.

9. The monitoring apparatus according to claim 7, wherein
the history data indicates at least the time at which failures have occurred in each predetermined time period; and
the display unit displays which type of fading has occurred in each period.

10. The monitoring apparatus according to claim 7, wherein the display unit displays which type of fading has occurred at a certain time on a certain date, in a graph with an axis indicating date and an axis indicating time on the date.

11. A method for distinguishing a failure cause comprising:
acquiring history data generated in one or more wireless communication apparatuses, the history data indicating at least information related to the time at which failures have occurred in each predetermined time period and related to a received signal level therein; and
distinguishing a type of fading that has occurred in the wireless lines related to the wireless communication apparatuses based on the history data, wherein
the time at which failures have occurred includes a first failure occurrence time at which a first failure has occurred and a second failure occurrence time at which a second failure of a degree which is higher than a degree of the first failure has occurred; and
it is determined that interference fading has occurred when a ratio of the second failure occurrence time to the sum of the first failure occurrence time and the second failure occurrence time is equal to or less than a predetermined first value.

12. The method for distinguishing a failure cause according to claim 11, wherein
the information related to the received signal level indicates a maximum value and a minimum value of the received signal level in each period; and it is determined that attenuation fading has occurred when the ratio of the second failure occurrence time to the sum of the first failure occurrence time and the second failure occurrence time is greater than the first value and a correlation coefficient between the maximum value and the minimum value of the received signal level is greater than a predetermined second value, and it is determined that duct type fading has occurred when the correlation coefficient is equal to or less than the second value.

13. The method for distinguishing a failure cause according to claim 11, further comprising displaying a distinguishing-result by the distinguishing.

14. The method for distinguishing a failure cause according to claim 13, further comprising displaying which type of fading has occurred for each wireless communication apparatus.

15. The method for a distinguishing failure cause according to claim 13, further comprising displaying which type of fading has occurred in each period.

16. The method for distinguishing a failure cause according to claim 13, further comprising displaying which type of fading has occurred at a certain time on a certain date, in a graph with an axis indicating date and an axis indicating time on the date.

17. A wireless communication system comprising:
one or more wireless communication apparatuses;
acquisition unit that acquires history data generated in the wireless communication apparatuses, the history data indicating at least information related to the time at which failures have occurred in each predetermined time period and related to a received signal level therein; and
distinguishing unit that distinguishes a type of fading that has occurred in the wireless lines related to the wireless communication apparatuses based on the history data, wherein
the time at which failures have occurred includes a first failure occurrence time at which a first failure has occurred and a second failure occurrence time at which a second failure of a degree which is higher than a degree of the first failure has occurred; and
the distinguishing unit determines that interference fading has occurred when a ratio of the second failure occurrence time to the sum of the first failure occurrence time and the second failure occurrence time is equal to or less than a predetermined first value.

18. A non-transitory computer readable medium storing a program for causing a computer to execute:
a step of acquiring history data generated in one or more wireless communication apparatuses, the history data indicating at least information related to the time at which failures have occurred in each predetermined time period and related to a received signal level therein, the time at which failures have occurred including a first failure occurrence time at which a first failure has occurred and a second failure occurrence time at which a second failure of a degree which is higher than a degree of the first failure has occurred; and
a step of distinguishing a type of fading that has occurred in wireless lines related to the wireless communication apparatuses based on the history data, and determining that that interference fading has occurred when a ratio of the second failure occurrence time to the sum of the first failure occurrence time and the second failure occurrence time is equal to or less than a predetermined first value.

* * * * *